(12) United States Patent
Kobayashi et al.

(10) Patent No.: US 6,402,260 B1
(45) Date of Patent: Jun. 11, 2002

(54) VEHICLE ANTI-LOCK BRAKE CONTROL SYSTEM

(75) Inventors: Masashi Kobayashi; Motoyasu Nakamura, both of Nagano (JP)

(73) Assignee: Nissin Kogyo Co., Ltd., Nagano-ken (JP)

( * ) Notice: Subject to any disclaimer, the term of this patent is extended or adjusted under 35 U.S.C. 154(b) by 0 days.

(21) Appl. No.: 09/656,881

(22) Filed: Sep. 7, 2000

(30) Foreign Application Priority Data

Sep. 9, 1999 (JP) .......................................... 11-255302

(51) Int. Cl.⁷ .............................................. B60T 15/14
(52) U.S. Cl. ...................... 303/20; 303/11; 303/116.4; 60/427; 701/71; 318/55; 318/101; 318/599
(58) Field of Search ............................... 303/20, 11, 10, 303/115.2, 115.4, 115.5, 116.4, 116.3; 60/325, 380, 427; 701/71, 36; 318/595, 596, 101, 102, 56, 55, 580, 586, 599

(56) References Cited

U.S. PATENT DOCUMENTS 5,184,299 A  *  2/1993 Hogan et al. .................. 701/71
5,188,440 A     2/1993 Müller et al.
5,487,593 A     1/1996 Potts et al. .................... 303/11
6,188,947 B1 *  2/2001 Zhan ............................ 701/71
6,196,643 B1 *  3/2001 Yokoyama et al. ......... 303/166

FOREIGN PATENT DOCUMENTS

| EP | 0 469 615 A1 | 2/1992 |
|----|--------------|--------|
| EP | 0 713 812 A2 | 5/1996 |
| JP | 11-171000    | 6/1999 |

* cited by examiner

*Primary Examiner*—Pam Rodriguez
(74) *Attorney, Agent, or Firm*—McGuireWoods LLP

(57) ABSTRACT

A rotational speed of an electric motor 12 is memorized at a memory unit 21 as a set rotational speed for allowing a minimum required volume of brake fluid to be discharged from the pumps in a state where the output hydraulic pressure of the master cylinder is highest, and an energizing duty ratio for the electric motor 12 which is designed so as to rotate the electric motor 12 at the set rotational speed is determined at a duty ratio determining unit 22 in response to an applied voltage detected at a voltage detecting unit 20. A motor control unit 23 controls the energizing of the electric motor 12 from a battery 18 in accordance with the energizing duty ratio determined at the duty ratio determining unit 22.

6 Claims, 5 Drawing Sheets

VEHICLE ANTI-LOCK BRAKE CONTROL SYSTEM

BACKGROUND OF THE INVENTION

1. Field of the Invention

The present invention relates a vehicle anti-lock brake control system comprising pumps for refluxing brake fluid to a master cylinder side and an electric motor for activating the pumps through power supply from a battery, and more particularly to an improvement in the rotation speed control of the electric motor.

2. Description of the Related Art

Conventional, vehicle anti-lock control systems as described above have been known through, for example, JP-A-11-171000.

In such conventional vehicle anti-lock brake control systems, the electric motor and pumps are set such that even when the voltage of the battery declines to the minimum operating voltage, the pumps discharge a minimum discharge volume of brake fluid which is required by the pumps when the output hydraulic pressure of the master cylinder is highest. In this conventional type of vehicle anti-lock control systems, the electric motor continues to be energized from the battery while the anti-lock brake control is being performed.

It is very rare, however, that the voltage of the battery declines to its minimum operating voltage, and while the anti-lock control is being performed normally, a high voltage of in the order of 14V is applied to the electric motor. Moreover, the electric motor is constructed such that the rotation speed thereof increases so does the applied voltage in a state in which the electric motor continues to be energized, and this means that while the anti-lock brake control is normally performed, the electric motor and pumps rotate at rotational speeds which are higher than required, and hence generate operation noise which is increased in noise level equally.

SUMMARY OF THE INVENTION

The present invention was made in view of these situations, and an object thereof is to provide a vehicle anti-lock brake control system which can reduce the operating noise level by suppressing the increase in rotational speed of the electric motor and pumps.

With a view to attaining the aforesaid object, according to a first aspect of the invention, there is provided a vehicle anti-lock brake control system comprising: a pump for refluxing brake fluid to a master cylinder side; an electric motor being activated by power supply from a battery, for driving the pump; a memory unit for memorizing as a set rotation speed a rotation speed of the electric motor for allowing a minimum required volume of brake fluid to be discharged from the pumps when the output hydraulic pressure of a master cylinder is maximum; a voltage detecting unit for detecting an applied voltage applied from the battery to the electric motor; a duty ratio determining unit for determining an energizing duty ratio for energizing the electric motor such that the electric motor is rotated at the set rotation speed memorized in the memory unit, in response to the applied voltage detected by the voltage detecting unit; and a motor control unit for duty controlling the energizing of the electric motor from the battery in accordance with the energizing duty ratio determined by the duty ratio determining unit.

According to the above construction, even when the applied voltage detected at the voltage detecting unit is high, a current supplied to the electric motor is reduced through the duty control, so that the rotation speed of the electric motor becomes the set rotation speed. Namely, the electric motor and the pumps are caused to rotate at the set rotation speed irrespective of the aforesaid applied voltage, and in the normal anti-lock brake control state where the applied voltage is high, the rotation speed of the electric motor and the pumps can be maintained relatively low to thereby reduce the operating noise. Moreover, this can help aim at saving on power used. In addition, the pulsation of the brake fluid that is refluxed to the master cylinder side is reduced by maintaining low the capacity of the pumps. This helps not only relax the kickback to the brake pedal to thereby improve the feeling of operating the brakes but also omit an orifice and a damper which are conventionally provided between the master cylinder and the pumps for relaxation of the pulsation that would otherwise remain remarkable.

According to a second aspect of the invention, there is provided a vehicle anti-lock brake control system comprising: a pump for refluxing brake fluid to a master cylinder side; an electric motor being activated by power supply from a battery, for driving the pump; a memory unit for memorizing as a set rotation speed a rotation speed of the electric motor for allowing a minimum required volume of brake fluid to be discharged from the pumps when the output hydraulic pressure of a master cylinder is maximum; a voltage detecting unit for detecting an applied voltage applied from the battery to the electric motor; a hydraulic pressure detecting unit for detecting an output hydraulic pressure from the master cylinder; a duty ratio determining unit for determining an energizing duty ratio for energizing the electric motor such that the electric motor is rotated at the set rotation speed memorized in the memory unit, in response to the applied voltage detected by the voltage detecting unit; a compensating unit for compensating for the energizing duty ratio determined at the duty ratio determining unit based on a hydraulic pressure detected at the hydraulic pressure detecting unit; and a motor control unit for duty controlling in the energizing of the electric motor from the battery in accordance with an energizing duty ratio compensated by the compensating unit.

According to the construction of the second aspect of the invention, the energizing duty ratio determined at the duty ratio determining unit is such that it is determined in response to the applied voltage in order to allow the electric motor to rotate at the set rotation speed set for allowing the minimum required volume of brake fluid to be discharged from the pumps in the state where the output hydraulic pressure of the master cylinder is highest, that is, where the load applied to the electric motor is at its maximum, and therefore, the energizing duty ratio is not the reflection of the actual output hydraulic pressure of the master cylinder. However, the energizing duty ratio determined at the duty ratio determining unit is compensated for at the compensating unit in response to the hydraulic pressure detected by the hydraulic pressure detecting unit or the hydraulic pressure actually outputted by the master cylinder, and therefore, even when the applied voltage detected by the voltage detecting unit is high, the current supplied to the electric motor is reduced through the duty control, whereby the rotation speed of the electric motor becomes the rotation speed corresponding to the output hydraulic pressure of the master cylinder. Thus, in the normal anti-lock brake control state in which the applied voltage is high, the rotation speeds of the electric motor and the pumps becomes low so as to comply with the output hydraulic pressure of the master cylinder, whereby not only can the operating noise be reduced further but also the saving on electric power can be pursued further. In addition, the pulsation of brake fluid refluxed to the master cylinder side is reduced further, whereby not only can the feeling of operating the brakes be improved further but also the orifice and the damper that are conventionally provided between the master cylinder and the pumps can be omitted.

DETAILED DESCRIPTION OF THE PREFERRED EMBODIMENTS

A mode for carrying out the invention will be described below based on embodiments according to the invention shown in the accompanying drawings.

Figure 1:
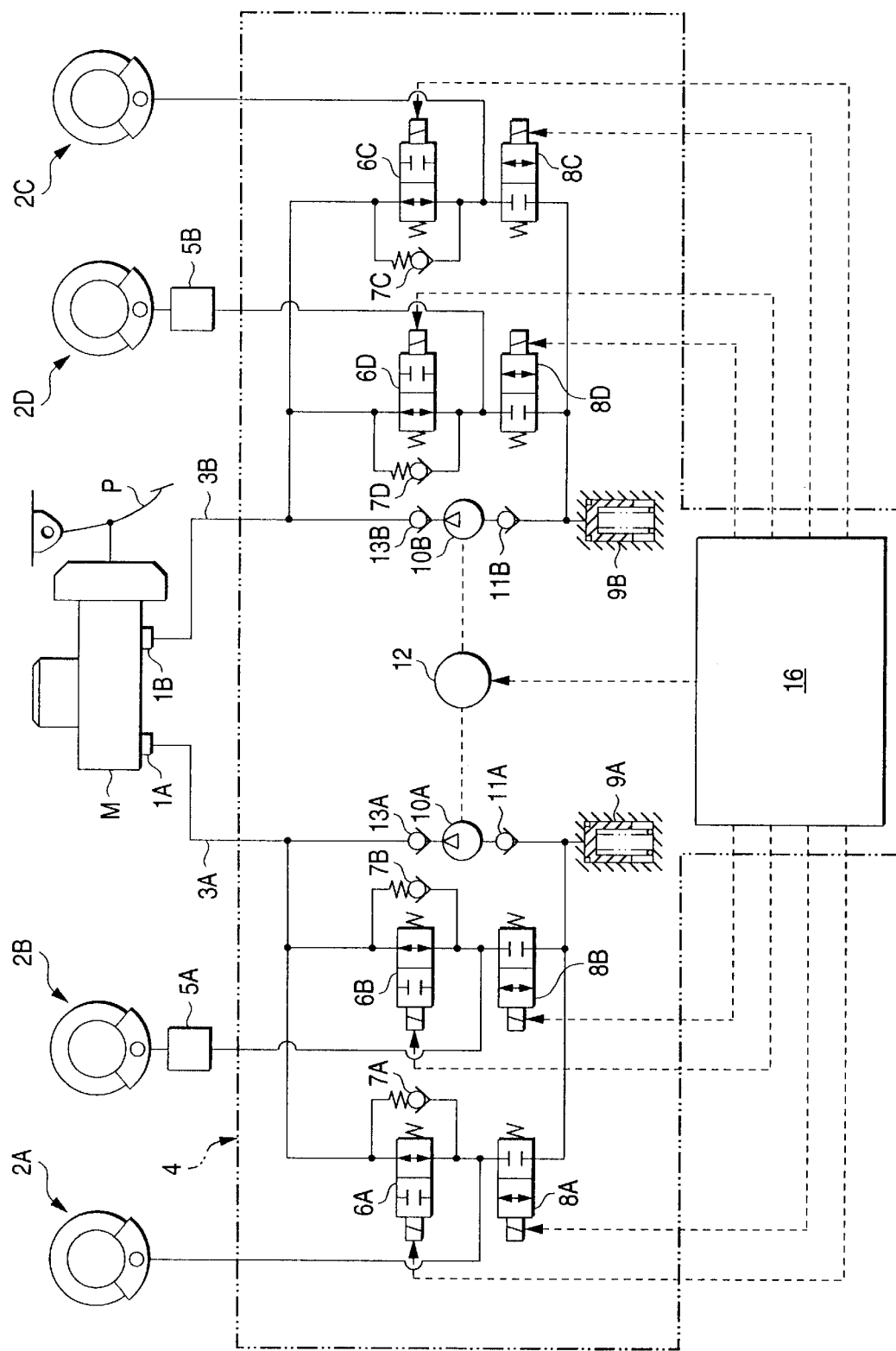
FIG. 1 is a hydraulic pressure circuit diagram for a vehicle brake system according to a first embodiment.
Figure 2:
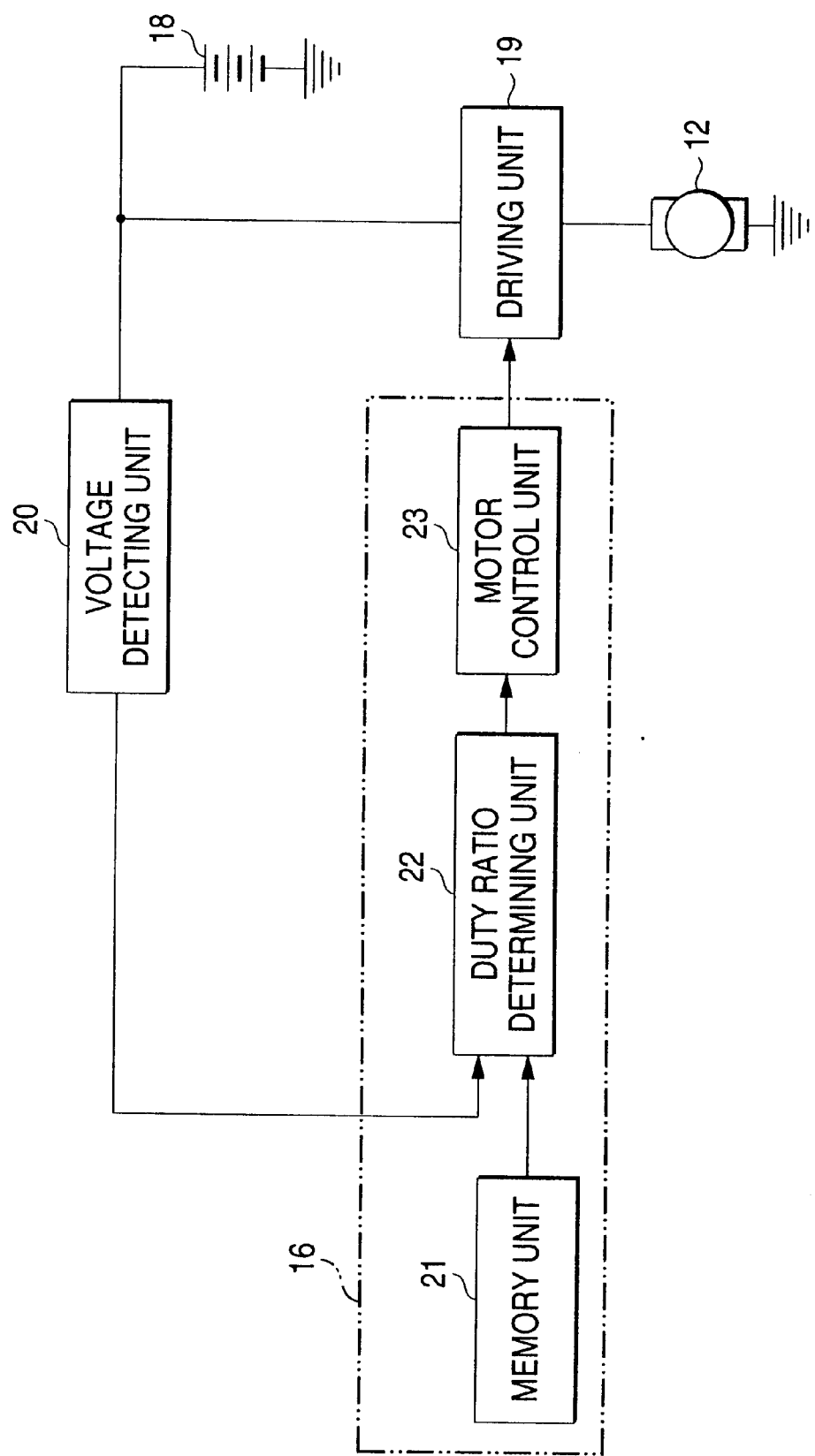
FIG. 2 is a block diagram showing the configuration of an electronic control unit for controlling the rotational speed of an electric motor.
Figure 3:
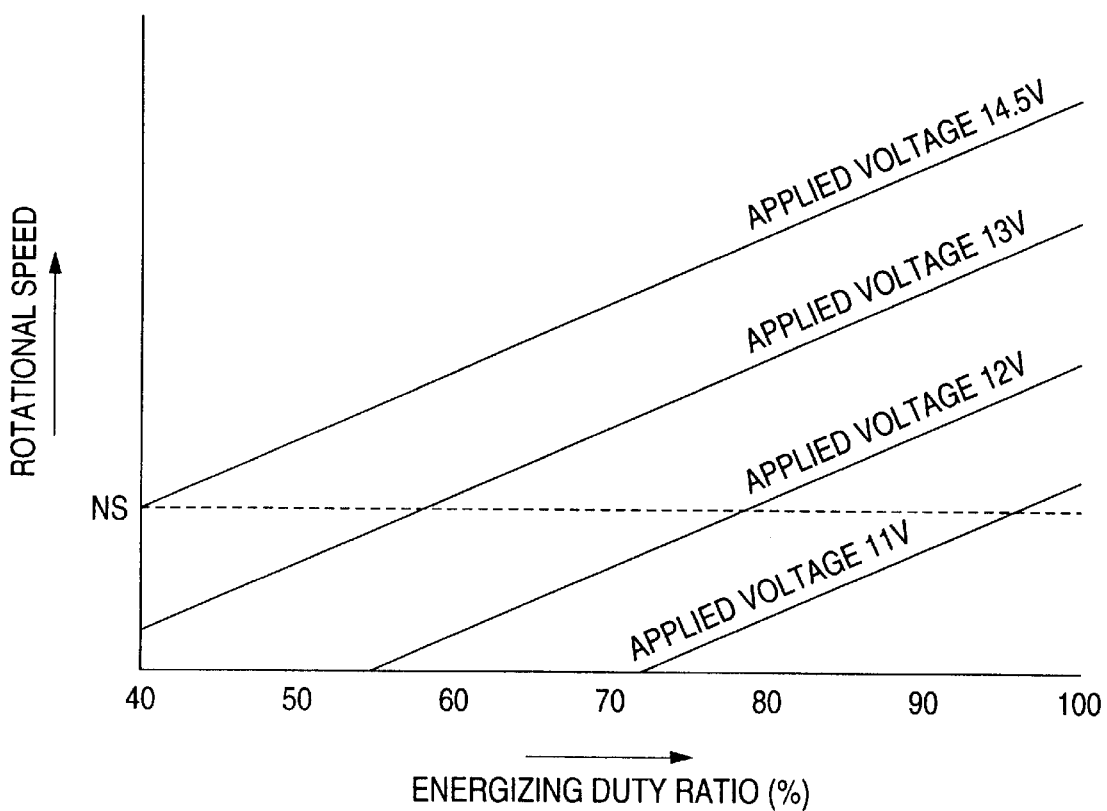
FIG. 3 is a diagram showing a map of energizing duty ratios and rotational speeds using as parameters applied voltages in a state where the output hydraulic pressure of the master cylinder is highest.

FIGS. 1 to 3 show a first embodiment of the invention. First, in FIG. 1, a tandem master cylinder M comprises first and second output ports 1A, 1B for generating brake hydraulic pressures in response to pedal efforts applied to a brake pedal P by the driver, and a hydraulic pressure control device 4 is provided between a wheel brake 2A for a left front wheel, a wheel brake 2B for a right rear wheel, a wheel brake 2C for a right front wheel and a wheel brake 2D for a left rear wheel, and first and second output hydraulic pressure paths 3A, 3B connected individually to the first and second output ports 1A, 1B. Additionally, first and second proportional pressure reducing valves 5A, 5B are interposed between the hydraulic pressure control device 4 and the wheel brakes 2B, 2D for the right and left rear wheels, respectively.

The hydraulic pressure control device 4 comprises first, second, third and fourth normally-opened electromagnetic valves 6A to 6D which correspond to the wheel brake 2A for the left front wheel, the wheel brake 2B for the right rear wheel, the wheel brake 2C for the right front wheel and the wheel brake 2D for the left rear wheel, respectively, first, second, third and fourth check valves 7A to 7D which are connected in parallel to the normally-opened electromagnetic valves 6A to 6D, respectively, first, second, third and fourth normally-closed electromagnetic valves 8A to 8D which correspond to the wheel brakes 2A to 2D, respectively, first and second reservoirs 9A, 9B which correspond individually to the first and second output hydraulic pressure paths 3A, 3B, first and second plunger pumps 10A, 10B connected to the first and second reservoirs 9A, 9B via inlet valves 11A, 11B, respectively, a single common electric motor 12 for driving both the pumps 10A, 10B, and an electronic control unit 16 for controlling the operation of the respective normally-opened electromagnetic valves 6A to 6D, the respective normally-closed electromagnetic valves 8A to 8D and the electric motor 12, respectively.

The first normally-opened electromagnetic valve CA is provided between the first output hydraulic pressure path 6A and the wheel brake 2A for the left front wheel, the second normally-opened electromagnetic valve 6B is provided between the first output hydraulic pressure path 3A and the first proportional pressure reducing valve 5A, the third normally-opened electromagnetic valve 6C is provided between the second output hydraulic pressure path 3B and the wheel brake 2C for the right front wheel, and the fourth normally-opened electromagnetic valve 6D is provided between the second output hydraulic pressure path 3B and the second proportional pressure reducing valve 5B.

Additionally, the first to fourth check valves 7A to 7D are connected to the normally-opened electromagnetic valves 6A to 6D in parallel, respectively, in such a manner as to permit brake fluid to flow from the corresponding wheel brakes 2A to 2D to the master cylinder M.

The first normally-closed electromagnetic valve 8A is provided between the wheel brake 2A for the left front wheel and the first reservoir 9A, the second normally-closed electromagnetic valve 8B is provided between the first proportional pressure reducing valve 5A and the first reservoir 9A, the third normally-closed electromagnetic valve 8C is provided between the wheel brake 2C for the right front wheel and the second reservoir 9B, and the fourth normally-closed electromagnetic valve 8D is provided between the second proportional pressure reducing valve 5B and the second reservoir 9B.

This hydraulic pressure control device 4 establishes communications between the master cylinder M and the wheel brakes 2A to 2D and interrupts communications between the wheel brakes 2A to 2D and the reservoirs 9A, 9B when the brakes are normally applied and there is no risk of the respective wheels being locked up. Namely, the respective normally-opened electromagnetic valves 6A to 6D are demagnetized so as to be put in an open state, while the respective normally-closed electromagnetic valves 8A to 8D are demagnetized so as to be put in a closed state, whereby the brake hydraulic pressure outputted from the first output port 1A of the master cylinder M is applied to the wheel brake 2A for the left front wheel and the wheel brake 2B for the right rear wheel via the first normally-opened electromagnetic valve 6A, and the second normally-opened electromagnetic valve 6B and the first proportional pressure reducing valve 5A, respectively. In addition, the brake hydraulic pressure outputted from the second output port 1B of the master cylinder M is applied to the wheel brake 2C for the right front wheel and the wheel brake 2D for the left rear wheel via the third normally-opened electromagnetic valve 6C, and the fourth normally-opened electromagnetic valve 6D and the second proportional pressure reducing valve 5B, respectively.

When the wheels are about to be put in a lockup state during the above braking operation, the hydraulic pressure control device 4 interrupts the communications between the master cylinder M and the wheel brakes 2A to 2D at portions corresponding to the wheels which are about to be put in the lockup state and then establishes communications between the wheel brakes 2A to 2D and the reservoirs 9A, 9B. Namely, the normally-opened electromagnetic valves of the first to fourth normally-opened electromagnetic valves 6A to 6D which correspond to the wheels which are about to be put in the lockup state are magnetized so as to be closed, and the normally-closed electromagnetic valves of the first to fourth normally-closed electromagnetic valves 8A to 8D which correspond to the above relevant wheels are magnetized so as to be opened, whereby part of the brake hydraulic pressures of the wheels which are about to be put in the lockup state is absorbed in the first reservoir 9A or the second reservoir 9B to thereby reduce the brake hydraulic pressures of the wheels which are about to be put in the lockup state.

In maintaining the brake hydraulic pressure constant, the hydraulic pressure control device 4 produces a state where the communications of the wheel brakes 2A to 2D with the master cylinder M and the reservoirs 9A, 9B are shut off. Namely, the normally-opened valves 6A to 6B are magnetized and closed, and the normally-closed electromagnetic valves 8A to 8D are demagnetized and closed. Furthermore, in increasing the brake hydraulic pressure, the normally-opened electromagnetic valves 6A to 6D may be demagnetized and opened, and the normally-closed electromagnetic valves may be demagnetized and closed.

Accordingly, the demagnetization and the magnetization of the normally-opened electromagnetic valves 6A to 6D and the normally-closed electromagnetic valves 8A to 8D are controlled by the electronic control unit 16, so that the braking can be effectively applied without locking up the wheel.

In FIG. 2, the electric motor 12 is connected to a battery 18 through a driving unit 19 such as a relay, and the operation of the electric motor 12 is controlled by controlling the operation of the driving unit 19 by the control unit 16.

A portion of the electronic control unit 16 for controlling the rotational speed of the electric motor 12 comprises a memory unit 21, a duty ratio determining unit 22 and a motor control unit 23.

The memory unit 21 is constructed such that it memorizes as a set rotational speed a rotational speed of the electric motor 12 at which a minimum required volume of brake fluid is allowed to be discharged from both the pumps 10A, 10B when the output hydraulic pressure of the master cylinder M is highest, and the set rotational speed memorized in the memory unit 21 is inputted into the duty ratio determining unit 22.

A voltage applied from the battery 18 to the electric motor 12 is detected by a voltage detecting unit 20, and an applied voltage detected by the voltage detecting unit 20 is inputted into the duty ratio determining unit 22. Namely, inputted into the duty ratio determining unit 22 are the set rotational speed memorized in the memory unit 21 and the applied voltage detected at the voltage detecting unit 20. The duty ratio determining unit 22 determines in response to the applied voltage an energizing duty ratio for energizing the electric motor 12 so that the electric motor 12 rotates at the set rotational speed.

In FIG. 3, a map of duty ratios and rotational speeds using as parameters applied voltages in a state where the output hydraulic pressure of the master cylinder is highest or where the load applied to the electric motor 12 is at its maximum is set in advance. An energizing duty ratio for rotating the electric motor 12 at the set rotational speed NS memorized in the memory unit 21 is determined at the duty ratio determining unit 22 based on the map of FIG. 3.

The motor control unit 23 is such that it controls the driving unit 19 so that the energizing of the electric motor 12 from the battery 18 on the basis of an energizing duty ratio determined at the duty ratio determining unit 22 is duty controlled.

According to this first embodiment, even when the applied voltage detected at the voltage detecting unit 20 is high, the current supplied to the electric motor 12 declines through the duty control by the motor control unit 23, whereby the rotational speed of the electric motor 12 becomes the set rotational speed. Namely, irrespective of the high applied voltage, the electric motor 12 and the pumps 10A, 10B rotate at the set rotational speed NS, and thus, the rotational speeds of the electric motor 12 and the pumps 10A, 10B can be maintained relatively low in the normal anti-lock brake controlling state where the applied voltage is high, whereby not only the operating noise of the electric motor 12 and the pumps 10A, 10B can be reduced but also electric power used can be attempted to be reduced.

Additionally, the pulsation of the brake fluid which is refluxed to the master cylinder side is reduced by suppressing low the discharge quantities of the pumps 10A, 10B, and therefore, the kickback to the brake Pedal P in the anti-lock brake controlling state is relaxed, whereby the operation feeling of the brake can be improved. Moreover, an orifice and a damper can be omitted which are conventionally provided between the master cylinder M and the pumps 10A, 10B for relaxation of the pulsation.

Figure 4:
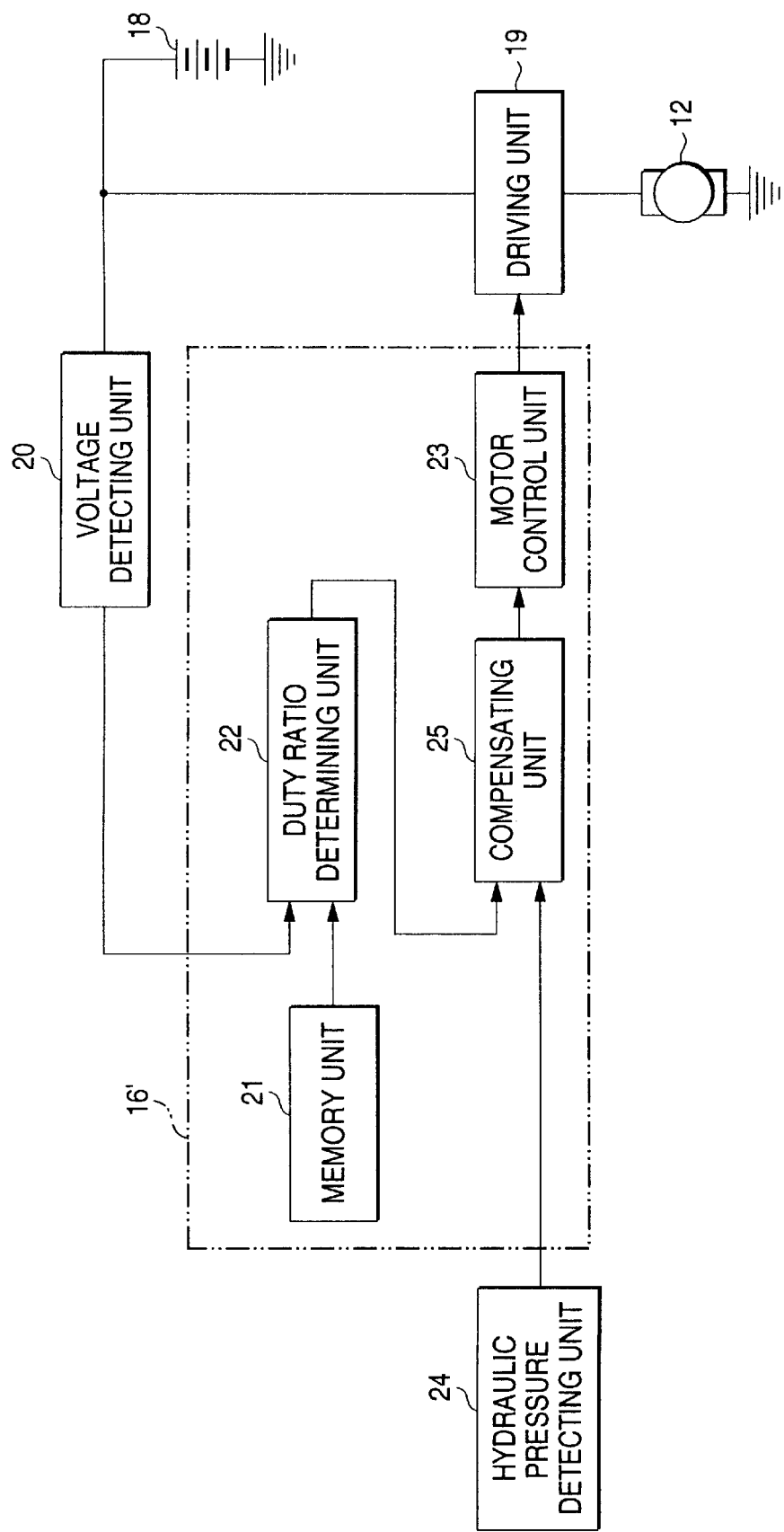
FIG. 4 is a block diagram showing the configuration of an electronic control unit for controlling the rotational speed of an electric motor according to a second embodiment.
Figure 5:
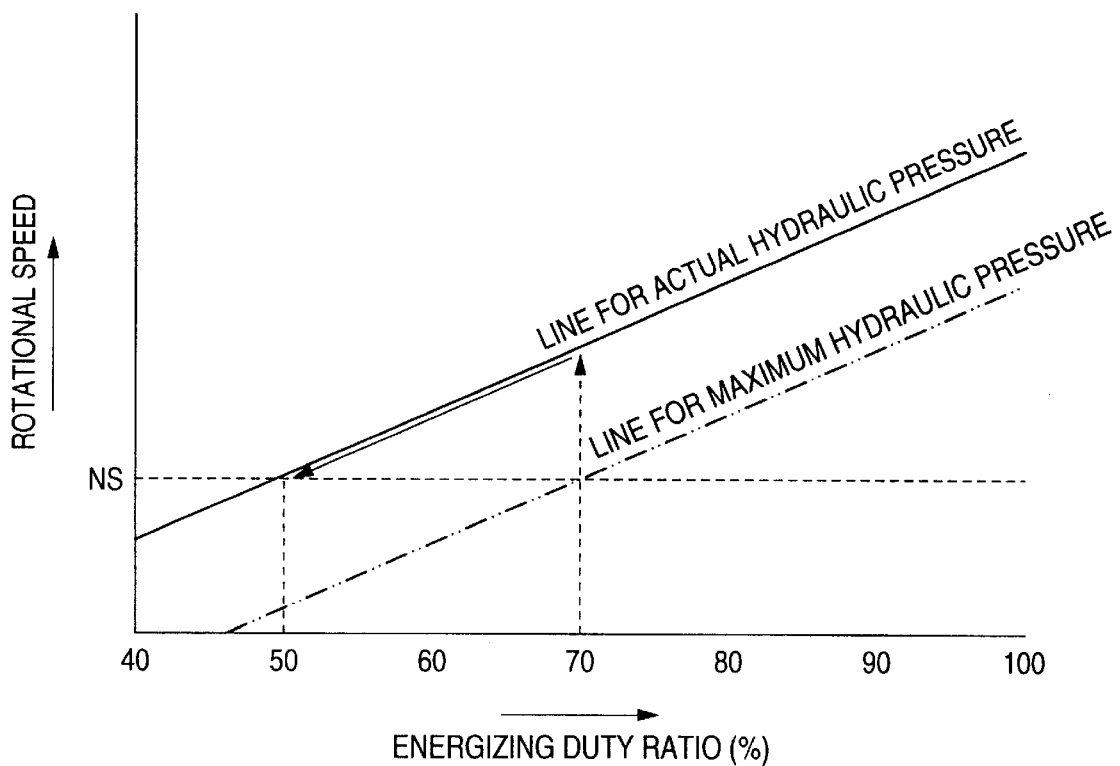
FIG. 5 is a diagram describing a compensation by a compensating unit.

Next, FIGS. 4 and 5 show a second embodiment of the invention. In FIG. 4, a portion of an electronic control unit 16' for controlling the rotational speed of an electric motor 12 comprises a memory unit 21, a duty ratio determining unit 22, a compensating unit 25 and a motor control unit 23.

Inputted in the compensating unit 25 are a hydraulic pressure detected by a hydraulic pressure detecting unit 24 for detecting the output hydraulic pressure of the master cylinder (refer to FIG. 1) and an energizing duty ratio determined at the duty ratio determining unit 22. The compensating unit 25 compensates for the energizing duty ratio determined at the duty ratio determining unit 22 based on a hydraulic pressure detected at the hydraulic pressure detecting unit 24.

The energizing duty ratio determined at the duty ratio determining unit 22 is determined based on the state where the output hydraulic pressure of the master cylinder is highest, and when the applied voltage is a certain value, the energizing duty ratio is determined based on characteristics designated in a chain line in FIG. 5. However, in a state where the actual output hydraulic pressure of the master cylinder M is lower than the maximum hydraulic pressure, in the event that the energizing of the electric motor 12 is duty controlled at an energizing duty ratio, for example, of 70%, which is determined based upon the state where the output hydraulic pressure of the master cylinder M is highest, the rotational speed of the electric motor 12 gets higher than the set rotational speed, as shown in FIG. 5. To counteract this, the compensating unit 25 compensates for the energizing duty ratio determined at the duty ratio determining unit 22 based upon the actual output hydraulic pressure of the master cylinder M, and obtains an energizing duty ratio (for example, 50%) at a position where a characteristics line designated in a solid line which is based on the actual output hydraulic pressure intersects with the set rotational speed NS, as shown in FIG. 5, as an energizing duty ratio after the compensation has completed.

Moreover, the motor control unit 23 controls the driving unit 19 such that the energizing of the electric motor 12 from the battery 18 is duty controlled based on the energizing duty ratio after the compensation by the compensating unit 25 has been completed.

The operation of the second embodiment will now be described. The energizing duty ratio determined at the duty ratio determining unit 22 is such that it is determined in response to the applied voltage in order to allow the electric motor 12 to rotate at the set rotational speed NS which is set for allowing the minimum required volume of brake fluid to be discharged from the pumps 10A, 10B in the state where the output hydraulic pressure of the master cylinder M is highest or where the load applied to the electric motor 12 is at its maximum, and therefore it is not the reflection of the actual output hydraulic pressure of the master cylinder M. However, the compensating unit 25 compensates for the energizing duty ratio determined at the duty ratio determining unit 22 in response to the hydraulic pressure detected at the hydraulic pressure detecting unit 24 or the hydraulic pressure which is actually outputted by the master cylinder M, and therefore, even when the applied voltage detected at the voltage detecting unit 20 is high, the current supplied to the electric motor 12 is reduced through the duty control, whereby the rotational speed of the electric motor 12 becomes a rotational speed which is in response to the output hydraulic pressure of the master cylinder M.

Consequently, in the normal anti-lock brake controlling state where the applied voltage is high, the rotational speeds of the electric motor 12 and the pumps 10A, 10B becomes low so as to comply with the output hydraulic pressure of the master cylinder M, whereby not only the operating noise can be reduced but also the electric power used can be attempted at being saved further. Additionally, the pulsation of the brake fluid which is refluxed to the master cylinder side is reduced further, whereby the feeling of operating the brakes can be improved further. Furthermore, it is similar to the first embodiment in that the orifice and the damper can be omitted which are conventionally provided between the master cylinder M and the pumps 10A, 10B.

Thus, while the embodiments of the invention have been described heretofore, the invention is not limited to those embodiments but may be modified variously in design without departing from the scope of the invention described under the claims of the invention.

According to the first aspect of the invention, not only the operating noise can be reduced by reducing the rotational speeds of the electric motor and the pumps relatively low but also the electric power used can be attempted at being saved. Additionally, the pulsation of the brake fluid which is refluxed to the master cylinder side is reduced to thereby relax the pedal kickback to the brake pedal, whereby not only the operation feeling of the brake can be improved but also an orifice and a damper can be omitted which are conventionally provided between the master cylinder M and the pumps.

Additionally, according to the second aspect of the invention, not only the operating noise of the electric pump 12 and the pumps 10A, 10B can be reduced by reducing the rotational speeds thereof to a low rotational one which complies with the output hydraulic pressure of the master cylinder but also the electric power used can be attempted at being saved further. Moreover, not only the operation feeling of the brake can be improved further but also an orifice and a damper can be omitted which are conventionally provided between the master cylinder and the pumps.

What is claimed is:

1. A vehicle anti-lock brake control system comprising:
   a pump for refluxing brake fluid to a master cylinder side;
   an electric motor being activated by power supply from a battery, for driving said pump;
   a memory unit for memorizing a rotation speed of said electric motor in a predetermined condition as a set rotation speed;
   a voltage detecting unit for detecting an applied voltage applied from said battery to said electric motor;
   a duty ratio determining unit for determining an energizing duty ratio for energizing said electric motor such that said electric motor is rotated at said set rotation speed memorized in said memory unit, in response to the applied voltage detected by said voltage detecting unit; and
   a motor control unit for duty controlling the energizing of said electric motor from said battery in accordance with the energizing duty ratio determined by said duty ratio determining unit.

2. The vehicle anti-lock brake control system according to claim 1, wherein said pump comprises a plurality of said pumps driven by said single electric motor.

3. A vehicle anti-lock brake control system comprising:
   a pump for refluxing brake fluid to a master cylinder side;
   an electric motor being activated by power supply from a battery, for driving said pump;
   a memory unit for memorizing a rotation speed of said electric motor in a predetermined condition as a set rotation speed, said set rotation speed memorized in said memory unit is a rotation speed of said electric motor for allowing a minimum required volume of brake fluid to be discharged from said pump when an output hydraulic pressure of a master cylinder is maximum;
   a voltage detecting unit for detecting an applied voltage applied from said battery to said electric motor;
   a duty ratio determining unit for determining an energizing duty ratio for energizing said electric motor such that said electric motor is rotated at said set rotation speed memorized in said memory unit, in response to the applied voltage detected by said voltage detecting unit; and
   a motor control unit for duty controlling the energizing of said electric motor from said battery in accordance with the energizing duty ratio determined by said duty ratio determining unit.

4. A vehicle anti-lock brake control system comprising
   a pump for refluxing brake fluid to a master cylinder side;
   an electric motor being activated by power supply from a battery for driving said pump;
   a memory unit for memorizing a rotation speed of said electric motor in a predetermined condition as a set rotation speed;
   a voltage detecting unit for detecting an applied voltage applied from said battery to said electric motor;
   a hydraulic pressure detecting unit for detecting an output hydraulic pressure from said master cylinder;
   a duty ratio determining unit for determining an energizing duty ratio for energizing said electric motor such that said electric motor is rotated at said set rotation speed memorized in said memory unit, in response to the applied voltage detected by said voltage detecting unit;
   a compensating unit for compensating for the energizing duty ratio determined at said duty ratio determining unit based on the hydraulic pressure detected at said hydraulic pressure detecting unit; and
   a motor control unit for duty controlling the energizing of said electric motor from said battery in accordance with an energizing duty ratio compensated by said compensating unit.

5. The vehicle anti-lock brake control system according to claim 4, wherein said pump comprises a plurality of said pumps driven by said single electric motor.

6. The vehicle anti-lock brake control system according to claim 4, wherein said set rotation speed memorized in said memory unit is a rotation speed of said electric motor for allowing a minimum required volume of brake fluid to be discharged from said pump when an output hydraulic pressure of a master cylinder is maximum.

* * * * *